(No Model.)
S. HARRIS.
COUPLING FOR TROLLEY WIRES.
No. 424,110. Patented Mar. 25, 1890.
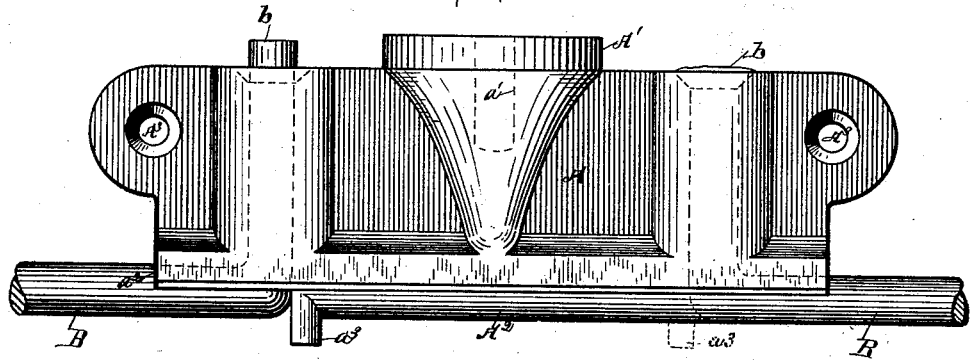
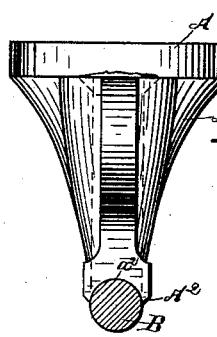
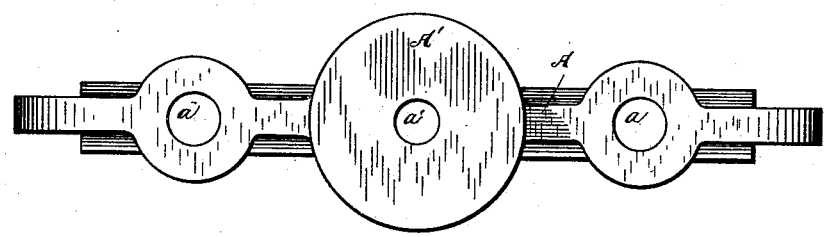
WITNESSES
INVENTOR
Samuel Harris.
Leggett and Leggett.
ATTORNEYS

UNITED STATES PATENT OFFICE.

SAMUEL HARRIS, OF CLEVELAND, OHIO, ASSIGNOR TO TOM L. JOHNSON, OF SAME PLACE.

COUPLING FOR TROLLEY-WIRES.

SPECIFICATION forming part of Letters Patent No. 424,110, dated March 25, 1890.

Application filed November 18, 1889. Serial No. 330,695. (No model.)

*To all whom it may concern:*

Be it known that I, SAMUEL HARRIS, of Cleveland, in the county of Cuyahoga and State of Ohio, have invented certain new and useful Improvements in Couplings for Trolley-Wires for Electric Street-Railways; and I do hereby declare the following to be a full, clear, and exact description of the invention, such as will enable others skilled in the art to which it pertains to make and use the same.

My invention relates to improvements in a coupling for trolley-wires for electric street-railways, such coupling comprising a coupling-plate set edgewise and having holes for receiving the upturned ends of the trolley-wires, the ends of the wire being usually secured by riveting. The lower edge of the plate has concaved seats for receiving the wire, and has a rounded section between the wires corresponding with the latter and constituting an even track for the travel of the trolley from one wire to the other. The under edge of the coupling-plate has also depending teats or lips adapted to be turned against the elbows of the wires to fill out the rounded corners of the elbows, the object of the invention being to provide a light, cheap, strong, and durable coupling for the purpose aforesaid.

Heretofore trolley-wires have usually been coupled by soldering the opposing end sections to a plate, but with the heavy strain, jarring, and vibration that the trolley-wires were subjected to the soldering was not reliable. I have therefore devised the coupling illustrated in the accompanying drawings.

Figure 1 is a side elevation. Fig. 2 is an end elevation. Fig. 3 is a plan.

A represents the coupling-plate, and B B the trolley-wires that are to be coupled.

Plate A is constructed, preferably, of brass or of such metals or materials as are good conductors of electricity, and at the same time are of sufficient strength for the purpose. The plate is provided with holes $a$ for receiving, respectively, the upturned ends $b$ of the wire, and usually these holes are approximately at right angles to the line of the wires. However, the direction of these holes is not essential, so long as they necessitate a sharp bend or elbow in the wire; but whether the respective bends of the wire are more or less than a right angle is not material. The coupling-plate is usually about five or six inches, more or less, in length, by, say, two inches, more or less, in width, and is comparatively thin—say three-sixteenths of an inch in thickness, more or less. Except where the holes occur, the metal is swelled out laterally to give sufficient strength around the holes. The upper edge of the plate, at the longitudinal center thereof, is provided with a comparatively broad flange A', the same having a central vertical screw-threaded hole $a'$ for attaching a lateral plate (not shown) in common use for attaching the cross-wires and insulating mechanism for the cross-wires. The dimensions and form of plate A can, of course, be varied indefinitely, according to circumstances. The under edge of plate A between holes $a$ is rounded, as shown at $A^2$, to correspond with the lower half of the wire with which it comes flush below, whereby an even track is presented for the travel of the trolley from one wire to the other. From holes $a$ to the end of plate A the lower edge of the latter is provided with concaved seat $a^2$, adapted to receive and embed the wire, leaving about half the wire exposed below. For filling out the rounded corners at the elbow of the wires, plate A is provided with depending teats or ears $a^3$, these ears being adapted to be hammered or pressed against the opposing rounded sections of the elbows to fill out the vacant corners, so that when these teats are dressed off a smooth, unbroken surface is had from the wires to member $A^2$. At the right hand in Fig. 1 the trolley-wire is shown riveted to the plate, and teat $a^3$ is shown as it appears after it has been hammered against the elbow of the wire and dressed off. At the left hand the wire is shown as it appears before riveting down the end and the teat before it is hammered against the elbow. Holes $A^3$ are for attaching diagonal guy-wires.

What I claim is—

In combination, trolley-wires having upturned ends, coupling-plate having holes for receiving the same, such plate having a rounded section constituting a track from wire to wire, teats depending from the plate, 5 such teats or ears being adapted to be pressed against the elbows of the wires to fill out the rounded sections of such elbows, substantially as set forth.

In testimony whereof I sign this specification, in the presence of two witnesses, this 16th day of September, 1889.

SAMUEL HARRIS.

Witnesses:
C. H. DORER,
ALBERT E. LYNCH.